No. 825,981. PATENTED JULY 17, 1906.
C. J. REED.
METHOD OF CONVERTING SPONGY LEAD INTO LEAD SULFATE.
APPLICATION FILED MAY 7, 1903.
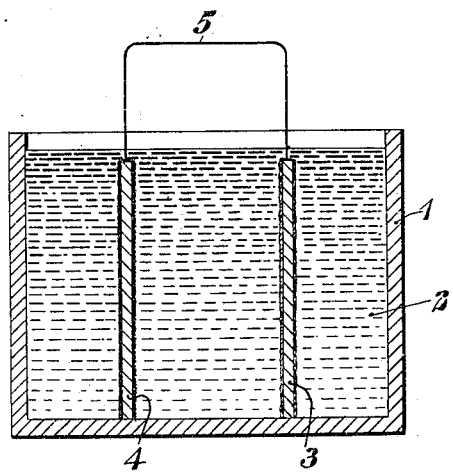
WITNESSES:
C. L. Belcher
O. S. Schairer
INVENTOR
Charles J. Reed
BY
Wesley G. Carr
ATTORNEY

UNITED STATES PATENT OFFICE.

CHARLES J. REED, OF PHILADELPHIA, PENNSYLVANIA, ASSIGNOR TO SECURITY INVESTMENT COMPANY, A CORPORATION OF PENNSYLVANIA.

METHOD OF CONVERTING SPONGY LEAD INTO LEAD SULFATE.

No. 825,981.      Specification of Letters Patent.      Patented July 17, 1906.

Application filed May 7, 1903. Serial No. 156,093.

*To all whom it may concern:*

Be it known that I, CHARLES J. REED, a citizen of the United States, and a resident of Philadelphia, in the county of Philadelphia and State of Pennsylvania, have invented a new and useful Improvement in Methods of Converting Spongy Lead into Lead Sulfate, of which the following is a specification.

My invention relates to secondary batteries, and particularly to the conversion of the negative-pole electrodes into positive-pole electrodes electrochemically and without the application of externally-generated electrical energy.

It is a common practice to convert secondary-battery electrodes, which comprise active material in the form of spongy or finely-divided lead, into positive-pole electrodes by a reversal process, and this usually consists in coupling together the plate having the spongy or finely-divided lead and a peroxid plate in a closed circuit when immersed in dilute sulfuric acid. The electrolytic action which takes place under these conditions converts a large part of the spongy lead into lead sulfate; but it also reduces the lead peroxid of the positive-pole electrode to lead sulfate, and therefore necessitates the use of a considerable number of charged positive-pole electrodes, which must subsequently be recharged at a considerable expenditure of electrical energy. The operation also requires more or less cumbrous apparatus, electrical machinery, and space in which such apparatus and machinery may be installed for successful operation.

My present invention consists in connecting a mass of spongy lead or an electrode containing spongy lead as its active material to an electrode consisting of carbon, platinum, or some other metal which is electronegative to lead and which is provided with a coating or deposit of platinum-black or finely-divided platinum and submerging such electrodes in a dilute solution of sulfuric acid. By connecting such electrodes in a closed circuit and submerging them in dilute sulfuric acid, as stated, the electrochemical action is exceedingly rapid and the metallic lead is in a short time converted into lead sulfate.

In the accompanying drawing I have illustrated in vertical section a suitable cell or receptacle 1 containing dilute sulfuric acid 2, in which are submerged a plate-electrode 3, having a coating of finely-divided or spongy lead, and another plate-electrode 4, having a coating of platinum-black or finely-divided platinum, the two plates being connected by a suitable conductor 5. This illustration is merely indicative of suitable means for practicing my process and is not restrictive as regards form, dimensions, and relative location of parts, except in so far as the process hereinbefore described imposes limitations upon such apparatus. This process not only obviates the necessity of employing electrical apparatus, and thereby reduces the expense; but it also enables me to convert the spongy lead into lead sulfate thoroughly and expeditiously.

I claim as my invention—

1. The process of converting spongy or finely-divided lead into lead sulfate, which consists in connecting the same in circuit with an electrode having a coating or deposit of platinum-black in a bath of dilute sulfuric acid.

2. The process of reversing a spongy-lead electrode, which consists in subjecting the same to the action of dilute sulfuric acid in conjunction with an electrode having a coating of platinum-black and connected therewith in a closed circuit and subsequently charging the same as a peroxid plate.

3. The process of converting the spongy lead of a negative-pole secondary-battery electrode into lead sulfate, which consists in subjecting the same to dilute sulfuric acid in conjunction with an electrode of electronegative material having a coating of platinum-black and connected therewith in a closed circuit.

4. The process of converting the spongy lead of a negative-pole secondary-battery plate into lead sulfate, which consists in subjecting the same to the action of dilute sulfuric acid in conjunction with an electronegative electrode having a coating or deposit of platinum-black or finely-divided platinum and to which it is connected in a closed circuit.

In testimony whereof I have hereunto subscribed my name this 23d day of March, 1903.

CHARLES J. REED.

Witnesses:
     WALTER H. HART,
     WILLIAM A. ROBBINS.